United States Patent
Yamanaka et al.

(10) Patent No.: US 11,440,091 B2
(45) Date of Patent: Sep. 13, 2022

(54) METHODS OF PRODUCING BONDED MAGNET AND COMPOUND FOR BONDED MAGNETS

(71) Applicant: NICHIA CORPORATION, Anan (JP)

(72) Inventors: Satoshi Yamanaka, Tokushima (JP); Takayuki Yano, Anan (JP)

(73) Assignee: NICHIA CORPORATION, Anan (JP)

( * ) Notice: Subject to any disclaimer, the term of this patent is extended or adjusted under 35 U.S.C. 154(b) by 205 days.

(21) Appl. No.: 16/251,956

(22) Filed: Jan. 18, 2019

(65) Prior Publication Data
US 2019/0224747 A1 Jul. 25, 2019

(30) Foreign Application Priority Data

Jan. 22, 2018 (JP) .............................. JP2018-008182
Oct. 30, 2018 (JP) .............................. JP2018-204193
Dec. 14, 2018 (JP) .............................. JP2018-234475

(51) Int. Cl.
*B22F 1/00* (2022.01)
*B22F 1/102* (2022.01)
(Continued)

(52) U.S. Cl.
CPC .............. *B22F 1/102* (2022.01); *H01F 1/059* (2013.01); *H01F 1/0558* (2013.01);
(Continued)

(58) Field of Classification Search
CPC .......... B22F 1/0062; B22F 1/102; B22F 1/16; B22F 1/148; B22F 1/052; B22F 3/227;
(Continued)

(56) References Cited

U.S. PATENT DOCUMENTS 4,462,919 A    7/1984   Saito et al.
5,280,068 A *   1/1994   Siebert .................... C08F 36/04
                                               525/108

(Continued)

FOREIGN PATENT DOCUMENTS

JP    S58-171802 A     10/1983
JP    H427102 A  *   1/1992
(Continued)

OTHER PUBLICATIONS

JPH08167512A English translation (Year: 2020).*
JPH427102A English translation (Year: 2020).*

*Primary Examiner* — Robert S Jones, Jr.
*Assistant Examiner* — Jiangtian Xu
(74) *Attorney, Agent, or Firm* — Hunton Andrews Kurth LLP (57) ABSTRACT

Included is a method of preparing a compound for bonded magnets, the method including: coating a magnetic material having an average particle size of 10 μm or less with a thermosetting resin and a curing agent at a ratio of the equivalent weight of the curing agent to the equivalent weight of the thermosetting resin of 2 or higher and 10 or lower to obtain a coated material; granulating the coated material by compression to obtain a granulated product; milling the granulated product to obtain a milled product; and surface treating the milled product with a silane coupling agent to obtain a compound for bonded magnets, the method either including, between the granulation and the milling, heat curing the granulated product to obtain a cured product, or including, between the milling and the surface treatment, heat curing the milled product to obtain a cured product.

15 Claims, 1 Drawing Sheet

1 : Gap (51) Int. Cl.

| | | |
|---|---|---|
| *H01F 1/059* | (2006.01) | |
| *H01F 1/055* | (2006.01) | |
| *B29B 7/00* | (2006.01) | |
| *B29B 7/46* | (2006.01) | |
| *B29B 9/06* | (2006.01) | |
| *B29B 9/12* | (2006.01) | |
| *B22F 3/20* | (2006.01) | |
| *B22F 3/22* | (2006.01) | |
| *C22C 33/02* | (2006.01) | |
| *B22F 9/04* | (2006.01) | |
| *B22F 1/16* | (2022.01) | |
| *B22F 1/052* | (2022.01) | |
| *B22F 1/148* | (2022.01) | |

(52) U.S. Cl.
CPC ............ *H01F 1/0596* (2013.01); *B22F 1/052* (2022.01); *B22F 1/148* (2022.01); *B22F 1/16* (2022.01); *B22F 3/227* (2013.01); *B22F 2003/208* (2013.01); *B22F 2009/047* (2013.01); *B22F 2301/40* (2013.01); *B22F 2304/10* (2013.01); *B22F 2998/10* (2013.01); *B22F 2999/00* (2013.01); *B29B 7/002* (2013.01); *B29B 7/46* (2013.01); *B29B 9/06* (2013.01); *B29B 9/12* (2013.01); *C22C 33/0257* (2013.01); *C22C 2202/02* (2013.01)

(58) Field of Classification Search
CPC .......... B22F 2003/208; B22F 2009/047; B22F 2301/40; B22F 2304/10; B22F 2998/10; B22F 2999/00; H01F 1/0558; H01F 1/059; H01F 1/0596; B29B 7/002; B29B 7/46; B29B 9/06; B29B 9/12; C22C 33/0257; C22C 2202/02
See application file for complete search history.

(56) References Cited

U.S. PATENT DOCUMENTS

| | | | |
|---|---|---|---|
| 6,334,908 B1 | 1/2002 | Kawano et al. | |
| 2002/0029824 A1 | 3/2002 | Kawano et al. | |
| 2004/0234767 A1* | 11/2004 | Leddy .................... | H01F 1/112 428/404 |
| 2008/0152916 A1* | 6/2008 | Guschl .................. | B22F 1/0059 428/407 |
| 2009/0096561 A1* | 4/2009 | Menjo ................... | H01F 1/0572 335/302 |
| 2012/0064448 A1* | 3/2012 | Sakamoto ............ | G03G 9/0832 430/106.1 |

FOREIGN PATENT DOCUMENTS

| | | | |
|---|---|---|---|
| JP | H0427102 A | | 1/1992 |
| JP | H0487304 A | | 3/1992 |
| JP | H05234727 A | | 9/1993 |
| JP | H05315116 A | | 11/1993 |
| JP | H08167512 A | * | 12/1994 |
| JP | H08167512 A | | 6/1996 |
| JP | H09-190909 A | | 7/1997 |
| JP | 2000-077220 A | | 3/2000 |
| JP | 2001-068313 A | | 3/2001 |
| JP | 2002231548 A | | 8/2002 |
| JP | 2004-115921 A | | 4/2004 |
| JP | 2015153778 A | | 8/2015 |
| JP | 2017-043804 A | | 3/2017 |
| JP | 2017043804 A | * | 3/2017 |

* cited by examiner

FIG.1

1 : Gap

FIG.2

METHODS OF PRODUCING BONDED MAGNET AND COMPOUND FOR BONDED MAGNETS

CROSS-REFERENCE TO RELATED PATENT APPLICATION

This application claims priority to Japanese Patent Application No. 2018-008182 filed on Jan. 22, 2018, Japanese Patent Application No. 2018-204193 filed on Oct. 30, 2018, and Japanese Patent Application No. 2018-234475 filed on Dec. 14, 2018. The disclosures of Japanese Patent Application No. 2018-008182, Japanese Patent Application No. 2018-204193, and Japanese Patent Application No. 2018-234475 are hereby incorporated by reference in their entireties.

BACKGROUND

Technical Field

The present invention relates to methods of producing a bonded magnet and a compound for bonded magnets.

Description of Related Art

JP 2017-43804 A discloses a method of producing a bonded magnet by melt-kneading a thermoplastic resin with SmFeN particles, compression molding the mixture to give a compound, and injection molding the compound. If SmFeN particles having a small size of 3 μm are used to produce a bonded magnet, the viscosity of the compound increases during the injection molding, causing difficulty in molding into a bonded magnet. A possible solution may be to use SmFeN particles having a larger size to increase their fluidity in the resin while achieving a high filling ratio. Disadvantageously, however, since the single domain particle size for anisotropic SmFeN particles is around 3 μm (see JP 2004-115921 A), particles having a particle size much greater than 3 μm are not in a single domain state and have lower coercive force.

Moreover, JP 2000-077220 A and JP 2001-068313 A disclose methods of producing a bonded magnet by consolidating a mass of particles with an epoxy resin to form granules. When a solid epoxy resin is used, the particles are inhibited from rotating and thus cannot show high orientation during molding in a magnetic field, thereby only providing a bonded magnet having low magnetic properties. On the other hand, when a liquid epoxy resin is used, the particles are allowed to rotate easily so that they can be highly oriented during molding in a magnetic field, thereby providing a bonded magnet having high magnetic properties. However, since the mixture of the magnetic material and the liquid epoxy resin is like thick syrup and has poor fluidity, it is difficult to load into a compression molding machine and lacks practical industrial use.

SUMMARY

The present invention aims to provide methods of producing a bonded magnet and a compound for bonded magnets, which provide improved remanence (Br).

An aspect of the present invention relates to a method of preparing a compound for bonded magnets, the method including: coating a magnetic material having an average particle size of 10 μm or less with a thermosetting resin and a curing agent at a ratio of the equivalent weight of the curing agent to the equivalent weight of the thermosetting resin of 2 or higher and 10 or lower to obtain a coated material; granulating the coated material by compression to obtain a granulated product; milling the granulated product to obtain a milled product; and surface treating the milled product with a silane coupling agent to obtain a compound for bonded magnets, the method either including heat curing the granulated product between the granulation and the milling, or including heat curing the milled product between the milling and the surface treatment.

Another aspect of the present invention relates to a method of preparing a bonded magnet, the method including: coating a magnetic material having an average particle size of 10 μm or less with a thermosetting resin and a curing agent at a ratio of the equivalent weight of the curing agent to the equivalent weight of the thermosetting resin of 2 or higher and 10 or lower to obtain a coated material; granulating the coated material by compression to obtain a granulated product; milling the granulated product to obtain a milled product; surface treating the milled product with a silane coupling agent to obtain a compound for bonded magnets; orientation injection molding the compound for bonded magnets to obtain a molded product; and magnetizing the molded product in a magnetizing field of 25 kOe or higher, the method either including heat curing the granulated product between the granulation and the milling, or including heat curing the milled product between the milling and the surface treatment.

Still another aspect of the present invention relates to a bonded magnet, including: a cured product formed from a magnetic material having an average particle size of 10 μm or less, a Si element, a thermosetting resin, and a curing agent; and a thermoplastic resin.

These aspects of the present invention provide methods of producing a bonded magnet and a compound for bonded magnets, which provide improved remanence.

DETAILED DESCRIPTION

Embodiments of the present invention are described in detail below. The following embodiments, however, are intended as examples to embody the technical idea of the present invention and are not intended to limit the scope of the present invention to the following embodiments. As used herein, the term "step" encompasses not only an independent step but also a step that may not be clearly distinguished from other steps, as long as a desired object of the step is achieved.

The method of preparing a compound for bonded magnets of the present invention includes: coating a magnetic material having an average particle size of 10 μm or less with a thermosetting resin and a curing agent at a ratio of the equivalent weight of the curing agent to the equivalent weight of the thermosetting resin of 2 or higher and 10 or lower to obtain a coated material; granulating the coated material by compression to obtain a granulated product; milling the granulated product to obtain a milled product; and surface treating the milled product with a silane coupling agent to obtain a compound for bonded magnets, wherein the method either includes, between the granulation and the milling, heat curing the granulated product to obtain a cured product, or includes, between the milling and the surface treatment, heat curing the milled product to obtain a cured product.

In the coating step of the present method, the thermosetting resin and the curing agent are incorporated at a ratio of the equivalent weight of the curing agent to the equivalent weight of the thermosetting resin of 2 or higher and 10 or lower, unlike in the prior art (a ratio of around 1). This allows the reactive groups in the thermosetting resin (e.g., glycidyl groups in an epoxy resin) to be sufficiently deactivated by the reactive groups in the curing agent (e.g., amino groups in DDS) while imparting moderate mechanical strength to the granulated product, milled product, cured product, and compound for bonded magnets to be formed in the subsequent production process. Thus, when the compound for bonded magnets in which the reactive groups of the thermosetting resin are sufficiently deactivated is kneaded with a thermoplastic resin to prepare a compound for injection molding, the reactive groups of the thermosetting resin do not react with the reactive groups in the thermoplastic resin (e.g., amide groups in nylon 12). Hence, it is possible to reduce an increase in the viscosity of the compound for injection molding during injection molding of the compound. Moreover, due to the moderate mechanical strength of the granulated product, milled product, cured product, and compound for bonded magnets, it is possible to reduce their partial disintegration into smaller particles while controlling the particle size of the compound for bonded magnets within an appropriate range. Thus, it is possible to reduce a viscosity increase caused by such small particles during injection molding while improving the filling ratio of the final bonded magnet to improve the remanence thereof. Furthermore, since the compound for injection molding contains a cured product formed from the thermosetting resin and the curing agent, the cured product will crack under the pressure applied during injection molding to form gaps between the resin and the magnetic material. This allows the magnetic material to rotate easily to provide a higher orientation ratio, resulting in improved remanence.

In the coating step, a magnetic material having an average particle size of 10 μm or less is coated with a thermosetting resin and a curing agent to obtain a coated material. Any coating method may be used. The coating of a magnetic material may be carried out by stirring a thermosetting resin, optionally dispersed or dissolved in an organic solvent, a curing agent, and a curing accelerator using a mixer. Any organic solvent may be used, including acetone, methyl ethyl ketone, toluene, xylene, etc.

Any magnetic material may be used, and examples include SmFeN, NdFeB, and SmCo rare earth magnetic materials. Among these, SmFeN magnetic materials are preferred in view of heat resistance and of being free from rare metals. The SmFeN magnetic material may be a nitride having a $Th_2Zn_{17}$-type crystal structure and containing the rare earth metal Sm, iron (Fe), and nitrogen (N) as represented by the formula: $Sm_xFe_{100-x-y}N_y$, preferably wherein x is 8.1 at % or more and 10 at % or less; y is 13.5 at % or more and 13.9 at % or less; and the balance is mainly Fe.

A SmFeN magnetic material may be produced by a method as disclosed in JP H11-189811 A. A NdFeB magnetic material may be produced by a HDDR method as disclosed in WO 2003/85147. A SmCo magnetic material may be produced by a method as disclosed in JP H08-260083 A. Moreover, the magnetic material may be surface treated with a silane coupling agent by, for example, a method as described in JP 2017-43804 A.

The magnetic material has an average particle size of 10 μm or less, preferably 6 μm or less, more preferably 4 μm or less. When the average particle size is greater than 10 μm, the compound for injection molding will have improved fluidity, which may eliminate the need to prepare a granulated product from a thermosetting resin. Herein, the average particle size is defined as the particle size corresponding to the 50th percentile by volume from the smallest particle size in a particle size distribution. Moreover, in view of demagnetization squareness, the magnetic material used preferably has a monodisperse particle size distribution.

Any thermosetting resin that can be cured by heat may be used, and examples include epoxy resins, phenolic resins, urea resins, melamine resins, guanamine resins, unsaturated polyesters, vinyl ester resins, diallyl phthalate resins, polyurethane resins, silicone resins, polyimide resins, alkyd resins, furan resins, dicyclopentadiene resins, acrylic resins, and allyl carbonate resins. Among these, epoxy resins are preferred in view of mechanical properties and heat resistance. The thermosetting resin is preferably a liquid at room temperature or a solid that can be dissolved in a solvent to become liquid. The amount of the thermosetting resin with respect to 100 parts by weight of the magnetic material is preferably 0.15 parts by weight or more and 0.65 parts by weight or less, and more preferably 0.3 parts by weight or more and 0.37 parts by weight or less. When the amount is more than 0.65 parts by weight, the filling ratio of the magnetic material into the bonded magnet is reduced so that remanence may decrease. When the amount is less than 0.15 parts by weight, the strength of the granulated product may be reduced so that smaller size particles can be formed during the steps leading to injection molding, thereby causing a viscosity increase during the injection molding.

Any curing agent capable of heat curing the selected thermosetting resin may be used. When the thermosetting resin is an epoxy resin, examples of the curing agent include amine curing agents, acid anhydride curing agents, polyamide curing agents, imidazole curing agents, phenolic resin curing agents, polymercaptan resin curing agents, polysulfide resin curing agents, and organic acid hydrazide curing agents. Examples of the amine curing agents include diaminodiphenylsulfone, meta-phenylenediamine, diaminodiphenylmethane, diethylenetriamine, and triethylenetetramine.

The amount of the curing agent is adjusted as a ratio of the equivalent weight of the curing agent to the equivalent weight of the thermosetting resin. The ratio of the equivalent weight of the curing agent to the equivalent weight of the thermosetting resin is preferably in the range of 2 or higher and 10 or lower, more preferably of 5 or higher and 7 or lower. When the ratio is higher than 10, the proportion of the thermosetting resin is reduced so that the resulting granulated product can have poor strength. When the ratio is lower than 2, the ratio of the reactive groups of the curing agent to the reactive groups of the thermosetting resin is so small that some reactive groups of the thermosetting resin can remain in the product. In the subsequent step of mixing with a thermoplastic resin, the remaining reactive groups of the thermosetting resin may react with the reactive groups of the thermoplastic resin so that a viscosity increase may occur during injection molding, making it difficult to form a bonded magnet. Herein, the equivalent weight of the thermosetting resin means the number of grams of resin containing one equivalent of reactive groups and, when the thermosetting resin is an epoxy resin, for example, it corresponds to the epoxy equivalent of the resin, while the equivalent weight of the curing agent means the active hydrogen equivalent weight.

The combined amount of the thermosetting resin and the curing agent relative to the combined amount of the magnetic material, the thermosetting resin, and the curing agent is preferably 5.5% by volume or higher and 8.6% by volume or lower. When it is lower than 5.5% by volume, the strength of the granulated product may be reduced so that smaller size particles can be formed during the steps leading to injection molding, thereby causing a viscosity increase during the injection molding. When it is higher than 8.6% by volume, the filling ratio of the magnetic material into the bonded magnet is reduced so that remanence may decrease.

A curing accelerator may be incorporated together with the thermosetting resin and the curing agent. Examples of the curing accelerator include 1,8-diazabicyclo[5.4.0]undecene-7, 1,5-diazabicyclo[4.3.0]nonene-5, 1-cyanoethyl-2-ethyl-4-methylimidazole, 2-methyl-4-methylimidazole, triphenylphosphine, and sulfonium salts. The amount of the curing accelerator is not particularly limited. Usually, the curing accelerator is added in an amount of 0.01% by weight or more and 10% by weight or less with respect to the combined amount of the thermosetting resin and the curing agent.

In the granulation step, the coated material is compressed to obtain a granulated product. Any compression method may be used. For example, a compression granulating machine may be used to compress the coated material by rolls or the like and then crush and granulate it by a granulator or the like to obtain a granulated product.

In the milling step, the granulated product is milled to obtain a milled product. Any milling method may be used, such as milling with a sample mill, a ball mill, a stamp mill, a mortar, or a mixer. The milled product may optionally be classified with a sieve or the like. The milled product preferably has an average particle size of 1000 μm or less, more preferably 500 μm or less. When the average particle size is greater than 1000 μm, the compound for bonded magnets may be broken by shear caused by the kneader during the preparation of a compound for injection molding, thereby resulting in formation of new surfaces not treated with a silane coupling agent. The new surfaces are not compatible with thermoplastic resins and thus can cause a viscosity increase during injection molding, making it impossible to form a bonded magnet. The lower limit of the average particle size is not particularly limited, but is preferably 30 μm or more, more preferably 40 μm or more, still more preferably 45 μm or more. When the average particle size is less than 30 μm, a viscosity increase may occur during injection molding, making it impossible to form a bonded magnet. Herein, the average particle size is defined as the particle size corresponding to the 50th percentile by volume from the smallest particle size in a particle size distribution.

In the surface treatment step, the milled product is surface treated with a silane coupling agent to prepare a compound for bonded magnets. The surface treatment of the milled product with a silane coupling agent increases binding between the magnetic material and the resin, thereby reducing a viscosity increase during injection molding.

Any surface treatment method may be used. The silane coupling agent is preferably a compound represented by the formula: X—Si—(OR)$_n$ wherein X represents an alkyl group having a polar group at the end; R represents a C1-C3 alkyl group; and n represents an integer of 1 or more and 3 or less, provided that the polar group in X has an amino group, a ureido group, an epoxy group, a thiol group, or a methacryloxy group. When the thermoplastic resin used is a nylon resin, the silane coupling agent is preferably one having an amino group with high affinity for the nylon resin, particularly preferably 3-aminopropyltrimethoxysilane, 3-aminopropyltriethoxysilane, 3-(2-aminoethyl)aminopropyltrimethoxysilane, or 3-(2-aminoethyl)aminopropylmethyltriethoxysilane.

The step of heat curing the thermosetting resin is performed between the granulation step and the milling step or between the milling step and the surface treatment step. In particular, it is preferably performed between the milling step and the surface treatment step so that cracks of the thermosetting resin on the surface of the milled granulated product can be repaired by the heat curing. The temperature of the heat curing may be selected depending on the properties of the thermosetting resin used. In order to effect heat curing while reducing the magnetic degradation of the magnetic material due to heat, the temperature is preferably in the range of 60° C. or higher and 250° C. or lower, more preferably of 180° C. or higher and 220° C. or lower.

The compound for bonded magnets prepared as above may be melt-kneaded with a thermoplastic resin to prepare a compound for injection molding. Any melt-kneading machine may be used, including single screw kneading machines, twin screw kneading machines, mixing rolls, kneaders, Banbury mixers, intermeshing twin screw extruders, and non-intermeshing twin screw extruders. The temperature of the melt-kneading is not particularly limited, and may be selected depending on the properties of the thermoplastic resin used. The temperature is preferably 180° C. or higher and 250° C. or lower.

The thermoplastic resin may be any injection-moldable resin, and examples include nylon resins (polyamide resins); polyolefins such as polypropylene (PP) and polyethylene (PE); polyesters; polycarbonates (PC); polyphenylene sulfide resins (PPS); polyether ether ketones (PEEK); polyacetals (POM); and liquid crystal polymers (LCP). Examples of the nylon resins include polylactams such as nylon 6, nylon 11, and nylon 12; condensates of dicarboxylic acids and diamines such as nylon 6,6, nylon 6,10, and nylon 6,12; polyamide copolymers such as nylon 6/6,6, nylon 6/6,10, nylon 6/12, nylon 6/6,12, nylon 6/6,10/6,10, nylon 6/6,6/6, 12, and nylon-6/polyether; nylon 6T, nylon 9T, nylon MXD6, aromatic nylons, and amorphous nylons. Among these, nylon 12 is preferred in order to balance low water absorption with moldability and mechanical strength.

The amount of the thermoplastic resin with respect to 100 parts by weight of the magnetic material is not particularly limited, and is preferably in the range of 6.00 parts by weight or more and 7.00 parts by weight or less, more preferably of 6.15 parts by weight or more and 6.40 parts by weight or less. When the amount is more than 7.00 parts by weight, the filling ratio of the magnetic material into the bonded magnet is reduced so that remanence may decrease. When the amount is less than 6.00 parts by weight, a viscosity increase may occur during injection molding, possibly making it impossible to form a bonded magnet.

A plasticizer may be incorporated together with the thermoplastic resin. Examples of the plasticizer include EHPB, CEPB, BA-16, and NA-18 all available from Ueno Fine Chemicals Industry, Ltd. The amount of the plasticizer is not particularly limited, and is preferably 1 part by weight or more and 50 parts by weight or less with respect to 100 parts by weight of the thermoplastic resin.

The method of producing a bonded magnet according to the aspect of the present invention includes: coating a magnetic material having an average particle size of 10 μm or less with a thermosetting resin and a curing agent at a ratio of the equivalent weight of the curing agent to the equivalent weight of the thermosetting resin of 2 or higher and 10 or lower to obtain a coated material; granulating the coated material by compression to obtain a granulated product; milling the granulated product to obtain a milled product; surface treating the milled product with a silane coupling agent to obtain a compound for bonded magnets; orientation injection molding the compound for bonded magnets; and magnetizing the molded product in a magnetizing field of 25 kOe or higher, wherein the method either includes, between the granulation and the milling, heat curing the granulated product to obtain a cured product, or includes, between the milling and the surface treatment, heat curing the milled product to obtain a cured product.

The coating, granulation, milling, surface treatment, and heat curing steps are as described above.

In the injection molding step, a compound for injection molding prepared by melt-kneading the compound for bonded magnets with a thermoplastic resin may be injection-molded while heat treating it in an orientation field to align the easy axes of magnetization (orientation step), thereby obtaining an oriented injection-molded product. The temperature of the cylinder of the injection molding machine may be any temperature that melts the compound for injection molding, and is preferably 250° C. or lower in order to reduce the magnetic degradation of the magnetic material due to heat. The injection pressure may be any pressure that is capable of injecting the molten compound. For example, when the compound is injection molded into a cavity WO mm, 7 mm height) in an injection molding machine at a cylinder temperature of 250° C., it is preferred in view of moldability to be able to completely load the compound into the cavity at 220 MPa or less. The temperature of the heat treatment in the orientation step is preferably, for example, in the range of 50° C. or higher and 200° C. or lower, more preferably of 80° C. or higher and 150° C. or lower. The magnitude of the orientation field in the injection molding step may be 637 kA/m (8 kOe) or higher, preferably 718 kA/m (9 kOe) or higher. Moreover, the upper limit of the magnitude of the orientation field is not particularly limited, and may be 1511 kA/m (19 kOe) or lower, preferably 1194 kA/m (15 kOe) or lower.

In the magnetization step, the oriented injection-molded product is magnetized in a magnetizing field to obtain a bonded magnet. The magnetization method may include, for example, pulsed magnetic field generation or static magnetic field generation. The injection-molded product prepared in the production method of the present invention can be sufficiently magnetized even in a low magnetizing field to achieve a high magnetization rate. Thus, the magnitude of the magnetizing field in the magnetization step may be 1990 kA/m (25 kOe) or higher, preferably 2785 kA/m (35 kOe) or higher. Moreover, the upper limit of the magnitude of the magnetizing field is not particularly limited, and may be 4777 kA/m (60 kOe) or lower, preferably 3184 kA/m (40 kOe) or lower.

The magnetization step is preferably followed by heat treating the magnetized bonded magnet. The heat treatment reduces the decrease in mechanical strength of the bonded magnet. The temperature of the heat treatment is preferably in the range of 90° C. or higher and 150° C. or lower, more preferably of 100° C. or higher and 140° C. or lower. The duration of the heat treatment is preferably in the range of 50 hours or longer and 2000 hours or shorter, more preferably of 100 hours or longer and 1000 hours or shorter.

The bonded magnet according to the aspect of the present invention includes: a cured product formed from a magnetic material having an average particle size of 10 μm or less, a Si element, a thermosetting resin, and a curing agent; and a thermoplastic resin.

The cured product formed from a magnetic material having an average particle size of 10 μm or less, a thermosetting resin, and a curing agent, and the thermoplastic resin are as described above. The Si element results from a surface treatment step that is as described above.

The filling ratio of the magnetic material into the bonded magnet may be 93% by weight or higher. A filing ratio of 93% by weight or higher can lead to higher remanence. The filling ratio of the magnetic material into the bonded magnet is also preferably 64% by volume or higher in view of remanence.

The magnetization rate of the magnetic flux of the bonded magnet may be 98.5% or higher, preferably 99% or higher. A magnetization rate of 98.5% or higher can lead to higher remanence. Herein, the magnetization rate is determined by dividing the measured remanence by the theoretical remanence.

When a SmFeN magnetic material is used, the remanence of the bonded magnet is preferably 0.83 Tesla or more, more preferably 0.84 Tesla or more. A remanence of 0.83 Tesla or more is considered high.

EXAMPLES

The present invention will be specifically described below with reference to, but not limited to, examples.

The materials used in examples and comparative examples are listed below. Magnetic material: SmFeN magnetic material (average particle size: 3 μm, monodisperse particle size distribution, remanence Br of the magnetic powder alone: 1.31 T) Silane coupling agent: Z-6011 (3-aminopropyltriethoxysilane)
Epoxy resin: Biphenyl type (epoxy equivalent weight: 186 g/eq), Dow Corning Toray Co., Ltd.
Curing agent: DDS (diaminodiphenyl sulfone, active hydrogen equivalent weight: 62.0 g/eq)
Curing accelerator: TPP (triphenylphosphine)
Plasticizer: BA-16, Ueno Fine Chemicals Industry, Ltd.

Example 1

Preparation of Coated Material

An amount of 100 parts by weight of the SmFeN magnetic material was surface treated with 1.875 parts by weight of ethyl silicate and 0.4 parts by weight of the silane coupling agent. A mixed solution prepared by dissolving and mixing 0.60 parts by weight of the epoxy resin, 0.44 parts by weight of the curing agent, and 0.002 parts by weight of the curing accelerator into 4 parts by weight of acetone was dropwise added and mixed into 100 parts by weight of the surface-treated SmFeN magnetic material with stirring-in a pan mixer to obtain an epoxy resin-coated material.

Preparation of Compound for Bonded Magnets

A granulated product was prepared from the coated material using a roller compactor (RCP-100, Kurimoto, Ltd.) with care to prevent, as much as possible, evaporation of the acetone in the coated material. The granulated product was milled with a sample mill (Daicel Corporation) at a frequency of 10 Hz and then classified using a 1000 μm-aperture sieve to obtain a milled product. The milled product was cured using a tray dryer in a nitrogen atmosphere at 200° C. for six hours. Next, the cured milled product was surface treated with the silane coupling agent in an amount of 0.2 parts by weight with respect to 100 parts by weight of the cured product and then dried using a tray dryer in a nitrogen atmosphere at 120° C. for five hours to obtain a compound for bonded magnets.

Compound for Injection Molding

An amount of 100 parts by weight of the compound for bonded magnets was mixed with 6.3 parts by weight of polyamide 12, and the mixture was melt-kneaded and extruded using a twin screw kneading machine at 230° C. to obtain a compound for injection molding filled with the magnetic material at a filling ratio of 93.17% by weight (64.85% by volume).

Production of Bonded Magnet

Figure 1:
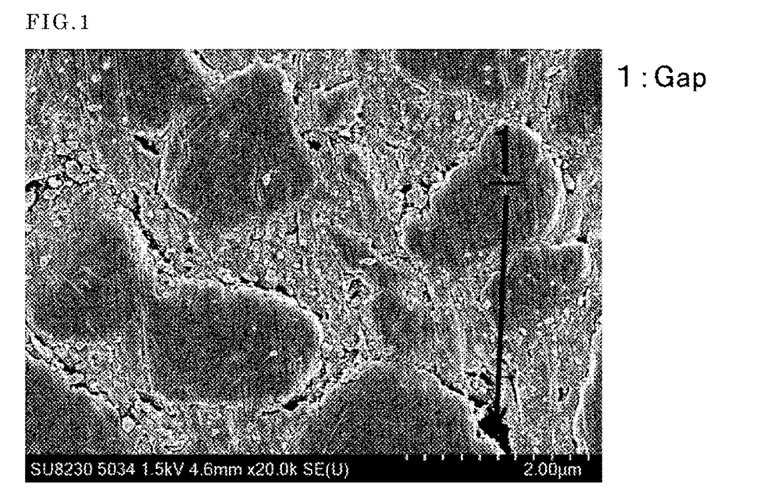
FIG. 1 shows a photograph of a cross section of a bonded magnet of Example 1.

The compound for injection molding was injection molded at a cylinder temperature of 250° C. and a mold temperature of 90° C. in an orientation field of 9 kOe to obtain a bonded magnet test piece with a diameter of 10 mm and a height of 7 mm. The injection pressure during the injection molding was 165 MPa. The bonded magnet was magnetized in a magnetic field of 60 kOe using an air core coil. Then, the remanence (hereinafter, referred to as Br) of the bonded magnet was measured with a BH tracer and found to be 0.85 T. This Br value was equal to the theoretical value 0.85 T, indicating a magnetization rate of 100.0%. FIG. 1 shows an SEM photograph of a cross section of the prepared bonded magnet. As seen in FIG. 1, gaps were observed between the magnetic material and the resin.

Example 2

A compound for injection molding filled with the magnetic material at a filling ratio of 93.16% by weight was prepared as in Example 1, except that a mixed solution was prepared by dissolving and mixing 0.50 parts by weight of the epoxy resin, 0.55 parts by weight of the curing agent, and 0.002 parts by weight of the curing accelerator into 4 parts by weight of acetone. The compound was injection molded as in Example 1, but using an injection pressure of 160 MPa. Thus, a bonded magnet with a remanence Br of 0.85 T was produced. This Br value was equal to the theoretical value 0.85 T, indicating a magnetization rate of 100.0%.

Example 3

A compound for injection molding filled with the magnetic material at a filling ratio of 93.15% by weight was prepared as in Example 1, except that a mixed solution was prepared by dissolving and mixing 0.43 parts by weight of the epoxy resin, 0.63 parts by weight of the curing agent, and 0.002 parts by weight of the curing accelerator into 4 parts by weight of acetone. The compound was injection molded as in Example 1, but using an injection pressure of 152 MPa. Thus, a bonded magnet with a remanence Br of 0.85 T was produced. This Br value was equal to the theoretical value 0.85 T, indicating a magnetization rate of 100.0%.

Example 4

A compound for injection molding filled with the magnetic material at a filling ratio of 93.15% by weight was prepared as in Example 1, except that a mixed solution was prepared by dissolving and mixing 0.37 parts by weight of the epoxy resin, 0.69 parts by weight of the curing agent, and 0.002 parts by weight of the curing accelerator into 4 parts by weight of acetone. The compound was injection molded as in Example 1, but using an injection pressure of 140 MPa. Thus, a bonded magnet with a remanence Br of 0.85 T was produced. This Br value was equal to the theoretical value 0.85 T, indicating a magnetization rate of 100.0%.

Example 5

A compound for injection molding filled with the magnetic material at a filling ratio of 93.14% by weight was prepared as in Example 1, except that a mixed solution was prepared by dissolving and mixing 0.30 parts by weight of the epoxy resin, 0.78 parts by weight of the curing agent, and 0.002 parts by weight of the curing accelerator into 4 parts by weight of acetone. The compound was injection molded as in Example 1, but using an injection pressure of 132 MPa. Thus, a bonded magnet with a remanence Br of 0.85 T was produced. This Br value was equal to the theoretical value 0.85 T, indicating a magnetization rate of 100.0%.

Example 6

A compound for injection molding filled with the magnetic material at a filling ratio of 93.14% by weight was prepared as in Example 1, except that a mixed solution was prepared by dissolving and mixing 0.27 parts by weight of the epoxy resin, 0.81 parts by weight of the curing agent, and 0.002 parts by weight of the curing accelerator into 4 parts by weight of acetone. The compound was injection molded as in Example 1, but using an injection pressure of 162 MPa. Thus, a bonded magnet with a remanence Br of 0.85 T was produced. This Br value was equal to the theoretical value 0.85 T, indicating a magnetization rate of 100.0%.

Example 7

A compound for injection molding filled with the magnetic material at a filling ratio of 93.13% by weight was prepared as in Example 1, except that a mixed solution was prepared by dissolving and mixing 0.23 parts by weight of the epoxy resin, 0.85 parts by weight of the curing agent, and 0.002 parts by weight of the curing accelerator into 4 parts by weight of acetone. The compound was injection molded as in Example 1, but using an injection pressure of 185 MPa. Thus, a bonded magnet with a remanence Br of 0.85 T was produced. This Br value was equal to the theoretical value 0.85 T, indicating a magnetization rate of 100.0%.

Example 8

A compound for injection molding filled with the magnetic material at a filling ratio of 93.17% by weight was prepared as in Example 1, except that 100 parts by weight of the compound for bonded magnets obtained by the coupling treatment was mixed with 4.4 parts by weight of polyamide 12 and 1.9 parts by weight of the plasticizer to obtain a resin mixture powder. The compound was injection molded as in Example 1, but using an injection pressure of 100 MPa. Thus, a bonded magnet with a remanence Br of 0.85 T was produced. This Br value was equal to the theoretical value 0.85 T, indicating a magnetization rate of 100.0%.

Comparative Example 1

A SmFeN magnetic material was surface treated with ethyl silicate and the silane coupling agent. An amount of 100 parts by weight of the surface-treated SmFeN magnetic material was mixed with 8.2 parts by weight of polyamide 12, and the mixture was melt-kneaded and extruded using a twin screw kneading machine at 230° C. to obtain a compound for injection molding filled with the magnetic material at a filling ratio of 92.42% by weight. The compound was injection molded as in Example 1, but using an injection pressure of 140 MPa. Thus, a bonded magnet with a remanence Br of 0.81 T was produced. This Br value was equal to the theoretical value 0.81 T, indicating a magnetization rate of 100.0%.

Comparative Example 2

A SmFeN magnetic material was surface treated with ethyl silicate and the silane coupling agent. An amount of 100 parts by weight of the surface-treated SmFeN magnetic material was mixed with 7.8 parts by weight of polyamide 12, and the mixture was melt-kneaded and extruded using a twin screw kneading machine at 230° C. to obtain a compound for injection molding with a filling ratio of 92.76% by weight. The compound was injection molded as in Example 1, but using an injection pressure of 220 MPa. Thus, a bonded magnet with a remanence Br of 0.81 T was produced. This Br value was lower than the theoretical value 0.825 T, indicating a magnetization rate of 98.1%.

Comparative Example 3

A SmFeN magnetic material was surface treated with ethyl silicate and the silane coupling agent. An amount of 100 parts by weight of the surface-treated SmFeN magnetic material was mixed with 7.5 parts by weight of polyamide 12, and the mixture was melt-kneaded and extruded using a twin screw kneading machine at 230° C. to obtain a compound for injection molding with a filling ratio of 93.02% by weight. The compound could not be completely loaded into the mold by injection molding as in Example 1, and thus the molding was failed.

Comparative Example 4

Figure 2:
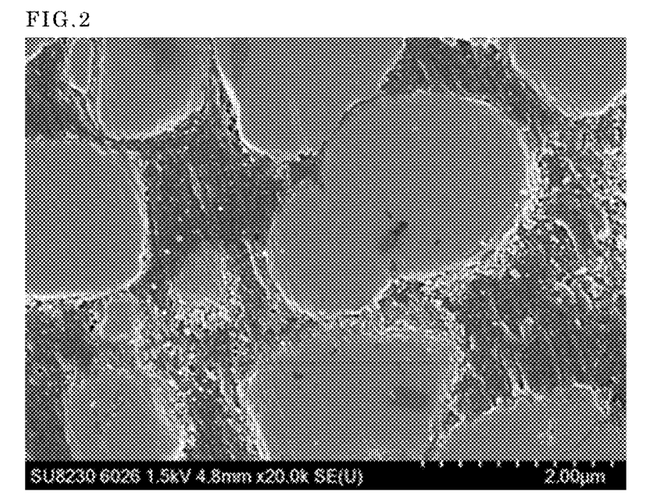
FIG. 2 shows a photograph of a cross section of a bonded magnet of Comparative Example 4.

A SmFeN magnetic material was surface treated with ethyl silicate and the silane coupling agent. An amount of 100 parts by weight of the surface-treated SmFeN magnetic material was mixed with 5.1 parts by weight of polyamide 12 and 1.9 parts by weight of the plasticizer, and the mixture was melt-kneaded and extruded using a twin screw kneading machine at 230° C. to obtain a compound for injection molding with a filling ratio of 93.46% by weight. The compound was injection molded as in Example 1, but using an injection pressure of 90 MPa. Thus, a bonded magnet with a remanence Br of 0.825 T was produced. This Br value was lower than the theoretical value 0.852 T, indicating a magnetization rate of 96.8%. Moreover, FIG. 2 shows an SEM photograph of a cross section of the bonded magnet. As seen in FIG. 2, no gap was observed between the magnetic material and the resin.

Comparative Example 5

A compound for injection molding with a filling ratio of 93.18% by weight was prepared as in Example 1, except that a mixed solution was prepared by dissolving and mixing 0.75 parts by weight of the epoxy resin, 0.28 parts by weight of the curing agent, and 0.002 parts by weight of the curing accelerator into 4 parts by weight of acetone. The compound could not be completely loaded into the mold by injection molding as in Example 1, and thus the molding was failed.

Comparative Example 6

A compound for injection molding with a filling ratio of 93.18% by weight was prepared as in Example 1, except for using a mixed solution prepared by dissolving and mixing 0.67 parts by weight of the epoxy resin, 0.37 parts by weight of the curing agent, and 0.002 parts by weight of the curing accelerator into 4 parts by weight of acetone. The compound could not be completely loaded into the mold by injection molding as in Example 1, and thus the molding was failed.

Comparative Example 7

A compound for injection molding with a filling ratio of 93.17% by weight was prepared as in Example 1, except that the granulation step for preparing a granulated product using a roller compactor was not performed, and instead a cured product of the epoxy resin-coated SmFeN magnetic material powder was prepared. The compound could not be completely loaded into the mold by injection molding as in Example 1, and thus the molding was failed.

Comparative Example 8

A compound for injection molding with a filling ratio of 93.17% by weight was prepared as in Example 1, except that the milling and classification steps were not performed, and instead a cured product of the SmFeN magnetic granulated product was prepared. The compound could not be completely loaded into the mold by injection molding as in Example 1, and thus the molding was failed.

Comparative Example 9

A compound for injection molding with a filling ratio of 93.17% by weight was prepared as in Example 1, except that the cured milled product was not surface treated with the silane coupling agent. The compound could not be completely loaded into the mold by injection molding as in Example 1, and thus the molding was failed.

Table 1 shows the composition formulations and evaluation results of Examples 1 to 8 and Comparative Examples 1 to 9.

TABLE 1

| Example No. | Formulation of coated material (parts by weight) Epoxy resin | Curing agent | Formulation of compound for injection molding (parts by weight) Polyamide | Plasticizer | Filling ratio (% by weight) | Evaluation results Br (T) | Magnetization rate (%) | Injection pressure (Mpa) |
|---|---|---|---|---|---|---|---|---|
| Example 1 | 0.60 | 0.44 | 6.3 | — | 93.17 | 0.85 | 100.0 | 165 |
| Example 2 | 0.50 | 0.55 | 6.3 | — | 93.16 | 0.85 | 100.0 | 160 |
| Example 3 | 0.43 | 0.63 | 6.3 | — | 93.15 | 0.85 | 100.0 | 152 |
| Example 4 | 0.37 | 0.69 | 6.3 | — | 93.15 | 0.85 | 100.0 | 140 |
| Example 5 | 0.30 | 0.78 | 6.3 | — | 93.14 | 0.85 | 100.0 | 132 |
| Example 6 | 0.27 | 0.81 | 6.3 | — | 93.14 | 0.85 | 100.0 | 162 |
| Example 7 | 0.23 | 0.85 | 6.3 | — | 93.13 | 0.85 | 100.0 | 185 |
| Example 8 | 0.60 | 0.44 | 4.4 | 1.9 | 93.17 | 0.85 | 100.0 | 100 |
| Comparative Example 1 | — | — | 8.2 | — | 92.42 | 0.81 | 100.0 | 140 |
| Comparative Example 2 | — | — | 7.8 | — | 92.76 | 0.81 | 98.1 | 220 |
| Comparative Example 3 | — | — | 7.5 | — | 93.02 | Unmoldable | | |
| Comparative Example 4 | — | — | 5.1 | 1.9 | 93.46 | 0.825 | 96.8 | 90 |
| Comparative Example 5 | 0.75 | 0.28 | 6.3 | — | 93.18 | Unmoldable | | |
| Comparative Example 6 | 0.67 | 0.37 | 6.3 | — | 93.18 | Unmoldable | | |
| Comparative Example 7 | 0.60 | 0.44 | 6.3 | — | 93.17 | Unmoldable | | |
| Comparative Example 8 | 0.60 | 0.44 | 6.3 | — | 93.17 | Unmoldable | | |
| Comparative Example 9 | 0.60 | 0.44 | 6.3 | — | 93.17 | Unmoldable | | |

The compounds for bonded magnets prepared in Example 5 and Comparative Example 1 were each injection molded as in Example 1 to form an oriented bonded magnet test piece. The bonded magnets were magnetized while varying the magnitude of the magnetizing field. Table 2 shows the experimental results of magnetizing field strength and magnetization rate. The product obtained by injection molding the compound for bonded magnets of Comparative Example 1 was merely 84% magnetized in a magnetizing field of 25 kOe. In contrast, the product obtained by injection molding the compound for bonded magnets of the present invention prepared in Example 5 was magnetized as high as 95% in the same magnetizing field of 25 kOe.

TABLE 2

| Magnetizing field kOe | Example 5 Flux µWb · T | Magnetization rate % | Comparative Example 1 Flux µWb · T | Magnetization rate % |
|---|---|---|---|---|
| 0 | 0 | 0 | 0 | 0 |
| 2 | 15 | 2 | 15 | 2 |
| 4 | 20 | 3 | 16 | 2 |
| 6 | 37 | 5 | 20 | 3 |
| 8 | 87 | 12 | 40 | 6 |
| 10 | 165 | 23 | 75 | 11 |
| 12 | 296 | 42 | 130 | 18 |
| 14 | 375 | 53 | 178 | 25 |
| 16 | 428 | 61 | 221 | 31 |
| 18 | 529 | 75 | 310 | 44 |
| 20 | 621 | 88 | 457 | 65 |
| 25 | 670 | 95 | 590 | 84 |
| 30 | 681 | 97 | 651 | 92 |
| 35 | 695 | 99 | 678 | 96 |
| 40 | 700 | 100 | 702 | 100 |
| 50 | 702 | 100 | 704 | 100 |
| 60 | 703 | 100 | 704 | 100 |

The bonded magnets prepared in Example 1 and Comparative Example 1 were placed and exposed to the atmosphere for 500 hours in an oven adjusted at 135° C. for heat treatment. The thus heat treated bonded magnets were measured for bending strength using a multipurpose strength tester to calculate the percentage of decrease compared to the strength before the heat treatment. The results are shown in Table 3. It was demonstrated that the bonded magnet of Example 1 had a higher bending strength, even after heat treatment, and thus a lower decrease in bending strength than the bonded magnet of Comparative Example 1.

TABLE 3

| | | Example No. Example 1 | Comparative Example 1 |
|---|---|---|---|
| Bending strength (MPa) | Before heat treatment | 104 | 92 |
| | After heat treatment | 79 | 61 |
| | Percentage of decrease (%) | 24 | 34 |

The method of preparing a compound for bonded magnets of the present invention enables production of a bonded magnet having improved remanence (Br). The produced bonded magnet has high magnetic properties and thus can be suitably used as a composite material or bonded magnet in applications such as motors.

What is claimed is:

1. A method of preparing a compound for bonded magnets, the method comprising:
    coating a magnetic material having an average particle size of 10 μm or less with a thermosetting resin and a curing agent at a ratio of the equivalent weight of the curing agent to the equivalent weight of the thermosetting resin of 2.2 or higher and 10 or lower to obtain a coated material;
    granulating the coated material by compression to obtain a granulated product;
    milling the granulated product to obtain a milled product;
    the method either comprising heat curing the granulated product between the granulation and the milling to obtain a cured product, or comprising heat curing the milled product to obtain a cured product; and
    surface treating the cured product with a silane coupling agent to obtain a compound for bonded magnets so that the silane coupling agent exists on a surface of the cured product.

2. The method of preparing a compound for bonded magnets according to claim 1,
    wherein the coating comprises mixing the thermosetting resin in an amount of 0.15 parts by weight or more and 0.65 parts by weight or less with respect to 100 parts by weight of the magnetic material.

3. The method of preparing a compound for bonded magnets according to claim 1,
    wherein the method comprises heat curing the milled product between the milling and the surface treatment.

4. The method of preparing a compound for bonded magnets according to claim 1,
    wherein the milled product has an average particle size of 1000 μm or less.

5. A method of preparing a bonded magnet, the method comprising:
    coating a magnetic material having an average particle size of 10 μm or less with a thermosetting resin and a curing agent at a ratio of the equivalent weight of the curing agent to the equivalent weight of the thermosetting resin of 2.2 or higher and 10 or lower to obtain a coated material;
    granulating the coated material by compression to obtain a granulated product;
    milling the granulated product to obtain a milled product;
    the method either comprising heat curing the granulated product between the granulation and the milling to obtain a cured product, or comprising heat curing the milled product to obtain a cured product;
    surface treating the cured product with a silane coupling agent to obtain a compound for bonded magnets so that the silane coupling agent exists on a surface of the cured product;
    orientation injection molding the compound for bonded magnets to obtain a molded product; and
    magnetizing the molded product in a magnetizing field of 25 kOe or higher.

6. The method of producing a bonded magnet according to claim 5,
    wherein the coating comprises mixing the thermosetting resin in an amount of 0.15 parts by weight or more and 0.65 parts by weight or less with respect to 100 parts by weight of the magnetic material.

7. The method of producing a bonded magnet according to claim 5,
    wherein the method comprises heat curing the milled product between the milling and the surface treatment.

8. The method of producing a bonded magnet according to claim 5,
    wherein the milled product has an average particle size of 1000 μm or less.

9. The method of producing a bonded magnet according to claim 5,
    wherein the magnetization is followed by heat treating the magnetized bonded magnet.

10. A method of preparing a bonded magnet, the method comprising:
    preparing a compound for bonded magnets according to the method of claim 1;
    melt-kneading the compound for bonded magnets with a thermoplastic resin to obtain a compound for injection molding;
    orientation injection molding the compound for injection molding to obtain a molded product; and
    magnetizing the molded product in a magnetizing field of 25 kOe or higher.

11. The method of preparing a compound for bonded magnets according to claim 1, wherein the milled product has an average particle size of 30 μm or more and 1000 μm or less.

12. The method of preparing a compound for bonded magnets according to claim 1, wherein the ratio of the equivalent weight of the curing agent to the equivalent weight of the thermosetting resin in the coating step is 5.59 or higher and 10 or lower.

13. The method of preparing the bonded magnets according to claim 5, wherein the ratio of the equivalent weight of the curing agent to the equivalent weight of the thermosetting resin in the coating step is 5.59 or higher and 10 or lower.

14. A method of preparing a compound for bonded magnets, the method comprising:
    coating a magnetic material having an average particle size of 10 μm or less with a thermosetting resin and a curing agent at a ratio of the equivalent weight of the curing agent to the equivalent weight of the thermosetting resin of 2.2 or higher and 11.09 or lower to obtain a coated material;
    granulating the coated material by compression to obtain a granulated product;
    milling the granulated product to obtain a milled product;
    the method either comprising heat curing the granulated product between the granulation and the milling to obtain a cured product, or comprising heat curing the milled product to obtain a cured product; and
    surface treating the cured product with a silane coupling agent to obtain a compound for bonded magnets so that the silane coupling agent exists on a surface of the cured product.

15. The method of preparing a compound for bonded magnets according to claim 14, wherein the ratio of the equivalent weight of the curing agent to the equivalent weight of the thermosetting resin in the coating step is 5.59 or higher and 11.09 or lower.

* * * * *